United States Patent [19]

Ishii et al.

[11] Patent Number: 4,672,165
[45] Date of Patent: Jun. 9, 1987

[54] WELDING APPARATUS

[75] Inventors: Kouichi Ishii; Susumu Mizugami; Mamoru Tabuchi, all of Kurashiki; Masayuki Nakamura, Hyogo; Toshihiko Baba, Nishinomiya; Naotake Ritoh, Minoo, all of Japan

[73] Assignees: Kawasaki Steel Corporation; Mitsubishi Denki Kabushiki Kaisha, both of Tokyo, Japan

[21] Appl. No.: 671,683

[22] Filed: Nov. 15, 1984

[51] Int. Cl.[4] .............................................. B23K 11/04
[52] U.S. Cl. ..................................... 219/97; 219/101; 219/105
[58] Field of Search ................. 219/101, 104, 106, 97, 219/100, 57

[56] References Cited
U.S. PATENT DOCUMENTS 3,941,972  3/1976  Toma ..................................... 219/97
4,147,913  4/1979  Clews et al. ......................... 219/97

FOREIGN PATENT DOCUMENTS 57-26196  6/1982  Japan .
58-38391  3/1983  Japan .
1366480  9/1974  United Kingdom ............... 219/105

OTHER PUBLICATIONS

"Application of Laser Welding to Electrical Steel Strip", Ono et al, Kawasaki Steel Technical Bulletin, vol. 14, No. 2, 1985.

Primary Examiner—E. A. Goldberg
Assistant Examiner—Catherine M. Sigda
Attorney, Agent, or Firm—Leydig, Voit & Mayer

[57] ABSTRACT

A welding apparatus for welding a trailing end of a preceding strip and a leading end of a subsequent strip including a shear device for cutting them in parallel and a back bar device for supporting the ends of the strips. Provision is made to detachably connect the shear device and the back bar device and move them along a common rail between the strip ends.

3 Claims, 5 Drawing Figures

WELDING APPARATUS

TECHNICAL FIELD

This invention relates to a welding apparatus, and more particularly to a welding apparatus in which a rear end of a preceding strip and a leading end of a subsequent strip are arranged in an opposing relationship to each other and fixed at their positions by a pair of clamp devices and thereafter cutting the opposite ends by a cutter and then welding between the cut ends.

BACKGROUND TECHNIQUE

One example of a conventional welding apparatus of this type is illustrated in FIGS. 1 and 2.

That is, in the figures, reference numeral 1 designates a base of a welding apparatus, 2 is a movable frame transversely movable on the base 1, 3 is an entrance clamp device for holding a subsequent strip 4a, 5 is a cylinder for actuating the entrance clamp, 6 is an exit clamp device for holding a preceding strip 4b, 7 is a cylinder for actuating the exit clamp device, 8 is a welding head for welding the end portions of the strips 4a, 4b with a collected laser beam, 9 is a slide guide for supporting and moving the welding head 8, 10 is a guide for transmitting a $CO_2$ gas layer beam from an unillustrated generator to the welding head 8, 11 is a shear device fixedly mounted on the movable frame 2, 12 is a cylinder for operating the shear device 11, and 13 is a back bar fixedly mounted on the movable frame 2 for supporting the strips.

Since the shear device 11 and the back bar 13 are fixed to a single movable frame 2 in the conventional apparatus, upon the inspection and the maintenance of the entrance and the exit clamp devices 3, 6 and the cylinders therefor 5, 7, the movable frame 2 becomes an obstacle impeding the personnel from entering between the entrance and the exit clamp devices 3 and 6, raising the disadvantages that the inspection and the maintenance of the entrance and the exit clamp devices 3, 6 and the cylinders 5, 7 are difficult.

DISCLOSURE OF THE INVENTION

An object of the present invention is to provide a welding apparatus in which the above disadvantage of the conventional apparatus is eliminated and in which the inspection and the maintenance of the clamp devices are easy.

Accordingly, the present invention provides a welding apparatus comprising a pair of clamp devices disposed in spaced relationship for fixedly holding the respective ends of first and second strips in abutment for welding, a shear device for cutting the ends of the strips in parallel, a structure for supporting the shear device for movement between the clamp devices, a backbar device for supporting the ends of the strips, a structure for supporting the backbar device for movement in the direction of movement of the shear device supporting structure, a welding apparatus for welding the abutted portion of the strips, and a mechanism for detachably connecting the shear device supporting structure and the backbar device supporting structure.

BEST MODE FOR EMBODYING THE INVENTION

Figure 1:
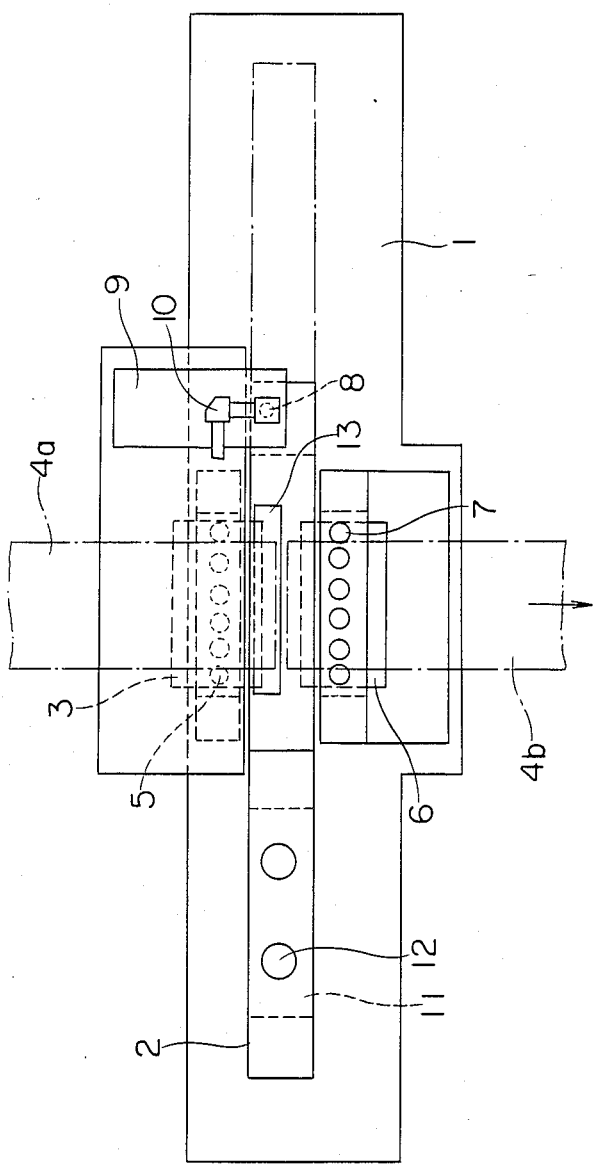
FIG. 1 is a plan view of a welding apparatus of a conventional design.
Figure 2:
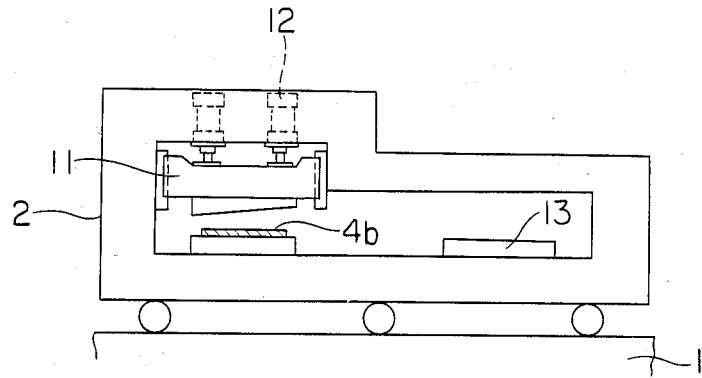
FIG. 2 is a front view of the movable frame shown in FIG. 1.

The welding apparatus of the present invention will now be described in conjunction with FIGS. 3 to 5 in which one embodiment the invention is illustrated.

In the figures, reference numeral 21 is a base, 22 is a rail disposed on the base 21, 23 is a stationary frame disposed on the base 21, on which entrance and exit clamp devices 3 and 6 are disposed through cylinders 5 and 7. Also, on the rail 22, a movable frame 24 in which a shear device 11 such as guillotine type double shear is incorporated together with its actuating cylinder 12, and a movable bed 27 in which a back bar device 25 and a cylinder 26 for the up and down movements of the back bar device 25 are incorporated, are movably mounted, and detachable connecting pieces 28 and 29 are mounted therebetween. Further, reference numeral 30 shown in FIG. 4 is a cylinder for driving the movable bed 27 along the rail 22, and the entrance strip 4a, the exit strip 4b, the welding head 8, the slide guide 9, and the transmitter 10 are the same as those used in the conventional apparatus. Also, the exit clamp device 6 is arranged to be able to move in the opposite direction to the flow of the strip by means of a cylinder 31.

The operation of the apparatus of the present invention which is constructed as described above will now be described.

Figure 3:
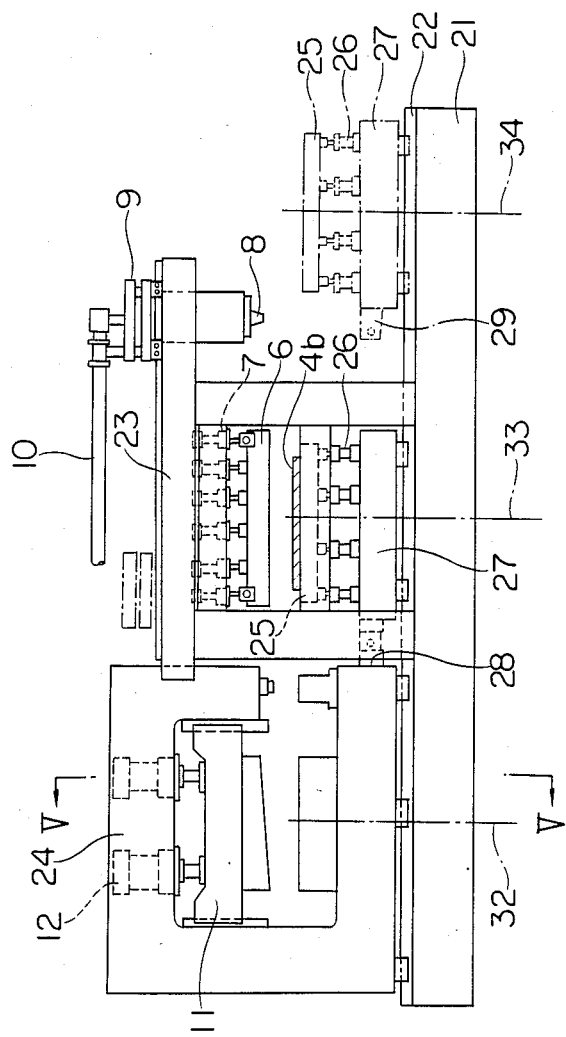
FIG. 3 is a front view of one embodiment of the welding apparatus of the present invention.

In the usual operating condition, the movable frame 24 and the movable bed 27 are connected by a connecting pin or the like inserted through the connecting pieces 28 and 29 as shown in FIG. 3.

Figure 4:
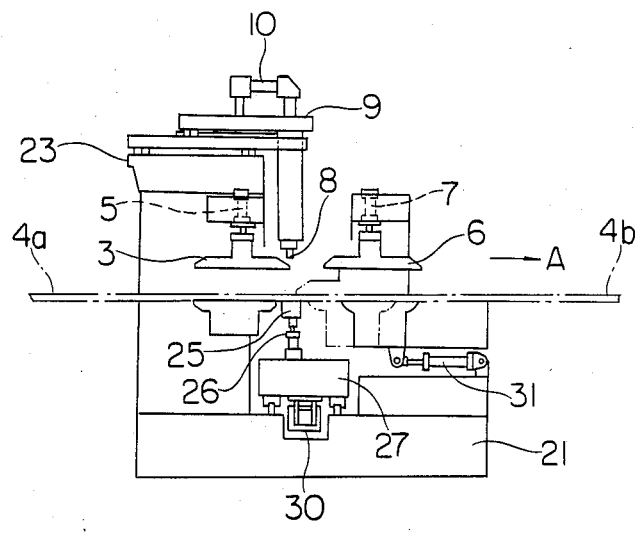
FIG. 4 is a side view of FIG. 3.

In a steel processing line, the strip is moved in the direction of an arrow A shown in FIG. 4 as it is being subjected to a continuous treatment such as acid cleaning, plating, heat treatment. During the movement of the strip, the movable frame 24 and the movable bed 27 are positioned in the position shown by solid lines in FIG. 3, and the welding head 8 is positioned also as shown in FIG. 3.

Figure 5:
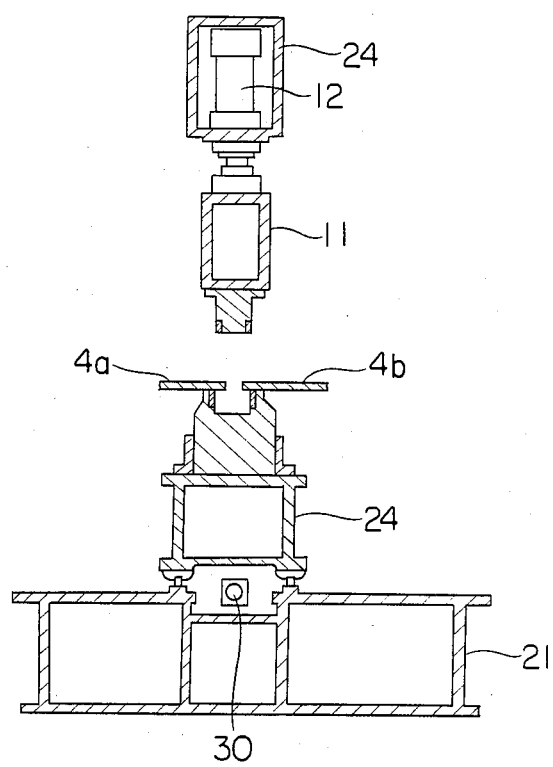
FIG. 5 is a sectional view taken along the line V—V of FIG. 3.

As the strip flows and reaches the terminal end in this manner, the rear end of this preceding strip 4b is guided and stopped within the blade width of the shear device 11 as shown in FIG. 5. In this condition, the leading end of the subsequent strip 4a is supplied within the blade width of the shear device 11. During such stoppage of the preceding strip 4b and the supply of the subsequent strip 4a, the shear center 32 of the shear device 11 comes in registry with the line center 33 by the movement of the movable frame 24. At this time, the back bar device 25 is moved to the position shown by dot-and-dash lines in FIG. 3 due to the connection of the connecting pieces 28 and 29 to shift the back bar center into the position shown by the reference numeral 34.

In this state, the clamp devices 3 and 6 are in the position shown by solid lines in FIG. 4.

Next, the cylinders 5 and 7 are actuated to fix the ends of the strips 4a and 4b by means of the clamp device 3 and 6.

Thus, after the ends of the strips 4a and 4b are fixed, the cylinder 12 of the shear device 11 is operated to press down the shear to cut the respective ends of the strips 4a and 4b with an accuracy necessary for welding.

After the cutting operation has been completed in this manner, the movable frame 24 having mounted thereon the shear device 11 returns to the position shown in FIG. 3, and thus the back bar device 25 moves to the position shown by solid lines in FIG. 3 through the connecting pieces 28 and 29 as well as the movable frame 27.

Next, the exit clamp 6, with the exit strip 4b kept clamped thereon, moves backward to the position shown by dot-and-dash lines in FIG. 4 by the cylinder 31 to thereby abut the ends of the strips 4a and 4b.

At this time, if there is a level difference between the ends of the strips 4a and 4b, the level of the back bar device 25 is adjusted by the cylinder 22 until the levels equal each other.

When the preparation for welding has been completed, the laser beam is transmitted to the welding head 8 through the transmission path 10, and the welding head 8 is moved above the abutted ends of the strips 4a and 4b through the slide guide 9, thereby welding the ends of the strips 4a and 4b.

Since this laser beam is a high density heat source, it is necessary for ensuring a high quality strip weld joint to precisely cut the strips 4a and 4b and accurately abut the cut ends and to accurately supply the laser beam along the butt welding line. In the above embodiment, the strips are kept secured in the same position throughout the cutting and welding operations and therefore a high quality weld can be obtained without being affected by any distortion or the like.

Further, in the apparatus of the present invention, upon the inspection and maintenance of the clamp devices 3 and 6, the movable frame 24 and the movable bed 27 mounted on the back bar device can be separated by disconnecting the disconnectable connecting pieces 28 and 29, and the movable frame 24 as well as the movable bed 27 mounted on the back bar device can also be moved outside the stationary frame 23 on which the clamp devices 3 and 6 are mounted. Therefore, a person is able to enter between the clamp devices 3 and 6 to inspect and maintain the clamp devices 3 and 6 including the cylinders 5 and 7, providing an advantage that the inspection and the maintenance of the clamp devices are very easy.

We claim:

1. A welding apparatus comprising a pair of clamp devices disposed in spaced relationship for fixedly holding the respective ends of firsat and second strips in abutment for welding, a shear device for cutting the ends of said strips in parallel, means for supporting said shear device for movement between said clamp devices, a backbar device for supporting the ends of said strips, means for supporting said backbar device for movement in the direction of movemenet of said shear device supporting means, a welding means for welding the abutted portion of said strips, and means for detachably connecting the shear device supporting means and the backbar device supporting means whereby the inspection and maintenance of the clamp devices is facilitated.

2. A welding apparatus as defined in claim 1 wherein said shear device supporting means and said backbar device supporting means move along a common rail.

3. The welding apparatus of claim 1 wherein said shear device supporting means includes a movable frame, wherein said backbar device supporting means includes a movable bed, and wherein the connecting means include connecting pieces attached to the frame and the bed and a connecting pin for connecting the connecting pieces.

* * * * *

UNITED STATES PATENT AND TRADEMARK OFFICE
CERTIFICATE OF CORRECTION

PATENT NO. : 4,672,165
DATED : June 9, 1987
INVENTOR(S) : Ishii et al

It is certified that error appears in the above-identified patent and that said Letters Patent is hereby corrected as shown below:

Page 1, Left-hand Column, insert:

[30] Foreign Application Priority Data

March 15, 1983 [JP]    Japan    42923

Signed and Sealed this

Thirty-first Day of January, 1989

Attest:

DONALD J. QUIGG

*Attesting Officer*    *Commissioner of Patents and Trademarks*